United States Patent [19]
Bessette et al.

[11] Patent Number: 5,725,125
[45] Date of Patent: Mar. 10, 1998

[54] METHOD OF AND MEANS FOR PROVIDING MULTIPLE FLAVORED BEVERAGES FROM A DISPENSING VALVE FROM A BEVERAGE DISPENSING UNIT

[75] Inventors: Brian P. Bessette, Colchester; William T. Guyette, Burlington, both of Vt.; William J. Eckardt, Oneonta, N.Y.

[73] Assignee: Emperor Tea Company, Ltd., Williston, Vt.

[21] Appl. No.: 533,439

[22] Filed: Sep. 25, 1995

[51] Int. Cl.⁶ .................................................. G01F 11/00
[52] U.S. Cl. .................... 222/1; 222/129.1; 222/144.5; 222/389
[58] Field of Search .................. 222/129.1, 144.5, 222/389

[56] References Cited

U.S. PATENT DOCUMENTS

| | | | |
|---|---|---|---|
| 3,637,116 | 1/1972 | Rutherford | 222/389 X |
| 4,753,370 | 6/1988 | Rudick | 222/144.5 X |
| 5,341,957 | 8/1994 | Sizemore | 222/129.1 X |
| 5,542,574 | 8/1996 | Stern | 222/389 X |

Primary Examiner—Joseph Kaufman
Attorney, Agent, or Firm—Thomas N. Neiman, Esq.

[57] ABSTRACT

The method of and apparatus for providing multiple flavored beverages from a dispensing valve from a beverage dispensing unit is designed to provide the ability to prepare a number of differently flavored beverages from a valve on a dispensing unit. The novel apparatus comprise a housing that contains the components on a support frame and provides protection for those components. The housing receives power from a power supply and has liquid supply lines and base product and flavor supply lines attached. Valves or pistons control the flow of base product, liquid and flavor and a desired combination of same is regulated. A flavor assembly that is composed of a flavor block, flavor containers, and check valves are installed within the housing. A single dispensing head directs the flow of water, base product and flavor into the serving container. The control system for the apparatus is comprised of a logic board, beverage dispenser actuator, flavor signal devices and indicators. The novel method of providing multiple flavored beverages from a dispensing valve from a beverage dispensing unit is also disclosed.

6 Claims, 4 Drawing Sheets

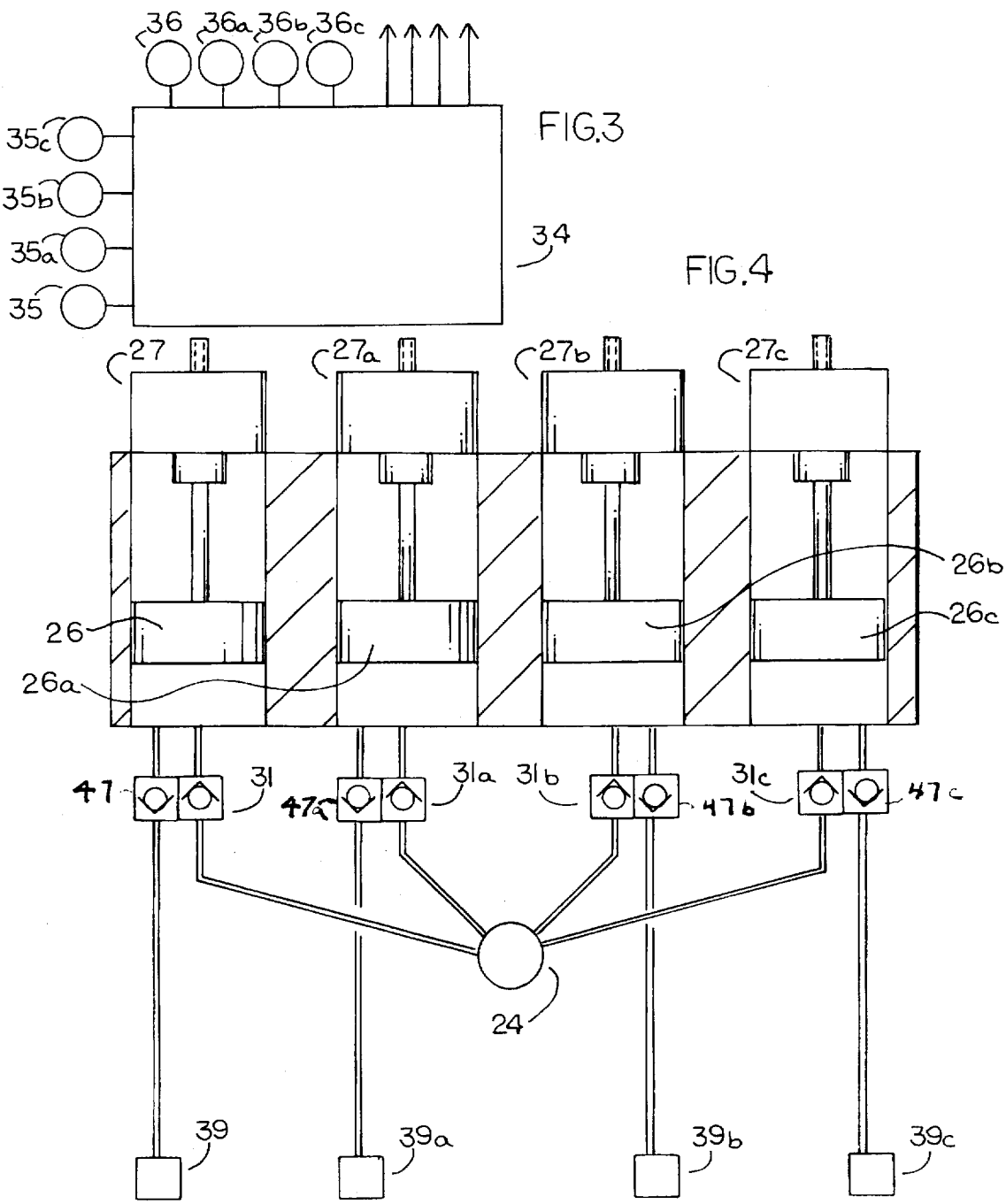

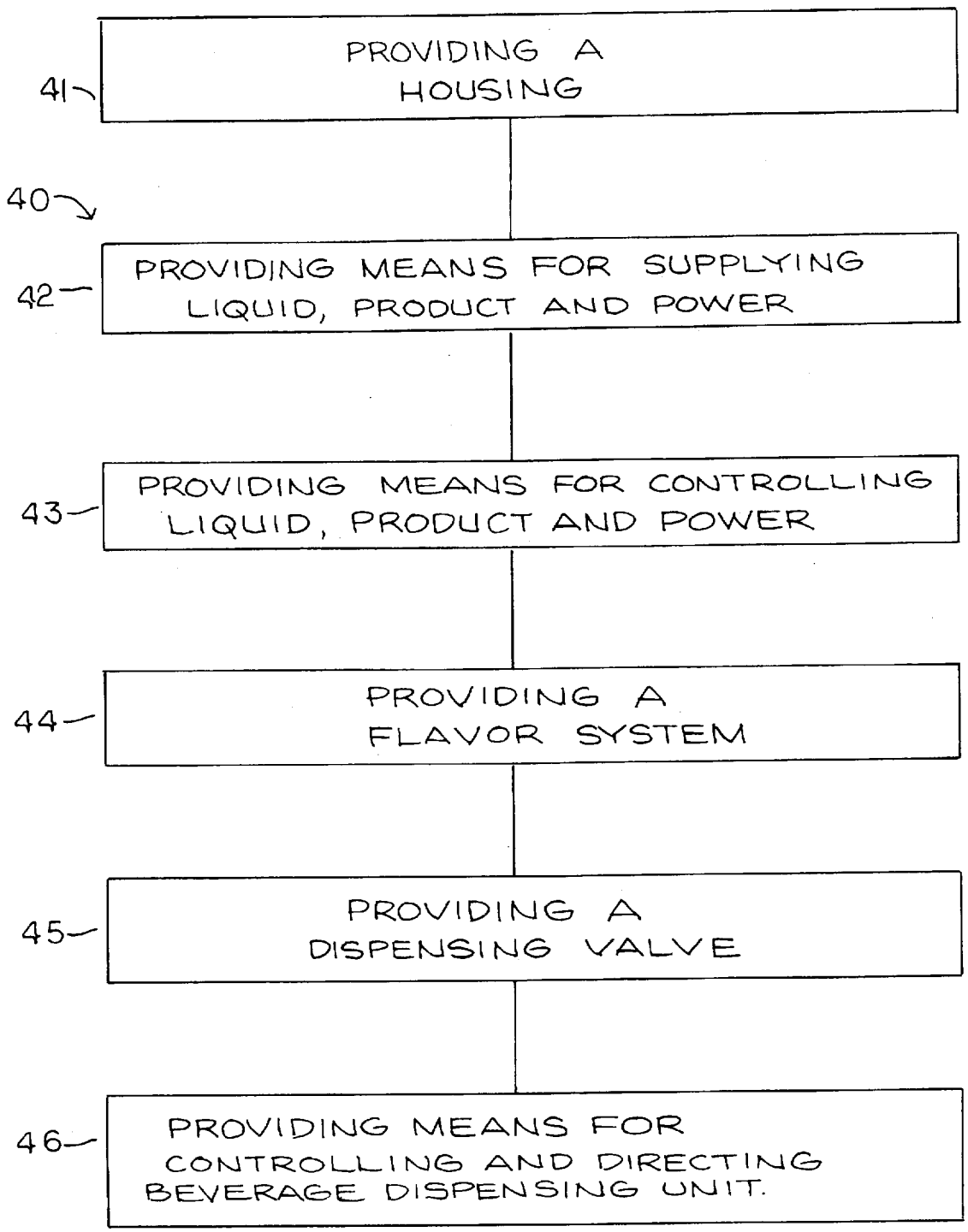

3,725,125

METHOD OF AND MEANS FOR PROVIDING MULTIPLE FLAVORED BEVERAGES FROM A DISPENSING VALVE FROM A BEVERAGE DISPENSING UNIT

BACKGROUND OF THE INVENTION

This invention pertains to over the counter dispensed beverage operations, and, in particular, to a method of and means for providing multiple flavored beverages from a dispensing valve from a beverage dispensing unit that will allow the operators of retail fountain drink establishments to provide a wider variety of uniquely flavored beverages without the necessity for a large area of space being used by separate flavor dispensing systems for each flavor.

There have been many different methods and devices that have been used in an attempt to deal with fountain drink operations. Initially, fountain drinks were served by spooning out syrup with a ladle from a syrup receptacle into a glass. Carbonated water was added from one of two goose necked dispensers, stirred with a spoon and ice was added at that time. Syrup was sold to the retailer usually in one gallon glass jugs and poured into the receptacles as needed. The problems inherent with this method included the lack of consistent measurement for the syrup contamination of the syrup when it was exposed to the air.

Later, manually operated stainless steel pumps replaced the ladles which improved the consistency of the product, but contamination was still a problem. This problem required breakdown of the pumps for cleaning which required time and reassembly of the pump. The next phase of the process was the introduction of a self contained multiple valve (one valve to a single flavor) dispensing units to replace the stainless steel pumps. The single gallon glass syrup jugs as a syrup source were replaced by reusable five gallon stainless steel tanks. The syrup was pumped from the tanks by means of carbon dioxide or compressed air and the flow of syrup to liquid was pre-set in a ratio of liquid to syrup. This system represents a more efficient operation over previous methods, however, sanitizing of the individual valves could be cumbersome and time consuming and the cost of the syrup tanks and the problem of their ownership and their life expectancy were major drawbacks. The tank has been replaced in the recent years by a bag in a box, which are syrup supply containers that accommodate syrup in plastic bags in corrugated boxes. The syrup is evacuated from the bag by electric or gas driven pumps, rather than the previous methods used with steel tank syrup supply sources.

What has not changed is the one flavor per valve restriction and the need to sanitize the valves. In order to expand the flavor selection, large, expensive and space consuming multiple valve systems are appearing, but he problem of one dispensing valve per flavor is still present. What is needed is a method of and means for a system that can deliver multiple flavored beverages, both hot and cold, from a dispensing valve from a beverage dispensing unit.

It is an object of this invention to set forth a method of and means for providing multiple flavored beverages from a dispensing valve from a beverage dispensing unit that avoids the disadvantages, and previously mentioned limitations of typical multiple valve beverage dispensing systems.

SUMMARY OF THE INVENTION

Particularly, it is the object of this invention to set forth a method for providing multiple flavored beverages from a dispensing valve from a beverage dispensing unit, fox use by drinking fountain locations in order to provide a flavored beverage from a multiple number of flavors in a limited amount of space, comprising the steps of providing a housing for supporting and protecting the components of the novel beverage dispensing unit; providing means for supplying liquid, base product, flavors and power for the beverage dispensing unit; providing means for controlling the liquid, base product, flavor and power for the beverage dispensing unit; providing a flavor system for the beverage dispensing unit; providing at least one dispensing valve for delivering the liquid, base product and flavor to a serving container; and providing means for controlling and directing the beverage dispensing unit.

Also, it is the object of this invention to set forth means for providing multiple flavored beverages from a dispensing valve from a beverage dispensing unit, for use by drinking fountain locations in order to provide a flavored beverage from a multiple number of flavors in a limited amount of space, comprising housing means for protecting the beverage dispensing unit; said housing means comprising a rigid structure; power supply means for permitting a source of power to said beverage dispensing unit; a plurality of supply lines for allowing the flow of base product and liquid from their storage sources to said beverage dispensing unit; means for directing the flow of base product and liquid from said storage sources to said beverage dispensing unit; a flavor system; said flavor system comprising means for introducing different flavors into said base product and/or liquid; said flavor system having drive means for directing said flavors from said storage sources to said flavor system; a beverage delivery system for directing the flow of base product, flavor and liquid into a serving container; operational control means for providing the oversight and control of said beverage dispensing unit; and said operational control means comprising a logic board for processing input and output signals from said beverage dispensing unit.

BRIEF DESCRIPTION OF THE INVENTION

Further objects and features of this invention will become more apparent by reference to the following description taken in conjunction with the accompanying figures, in which:

FIG. 2 is a side elevational view thereof;

FIG. 3 is a frontal view of the logic board of the novel system;

FIG. 4 is a frontal view of the flavor control system of the novel means; and

FIG. 5 is a block diagram of the novel method of providing multiple flavored beverages from a dispensing valve from a beverage dispensing unit.

DESCRIPTION OF THE PREFERRED EMBODIMENTS

Figure 1:
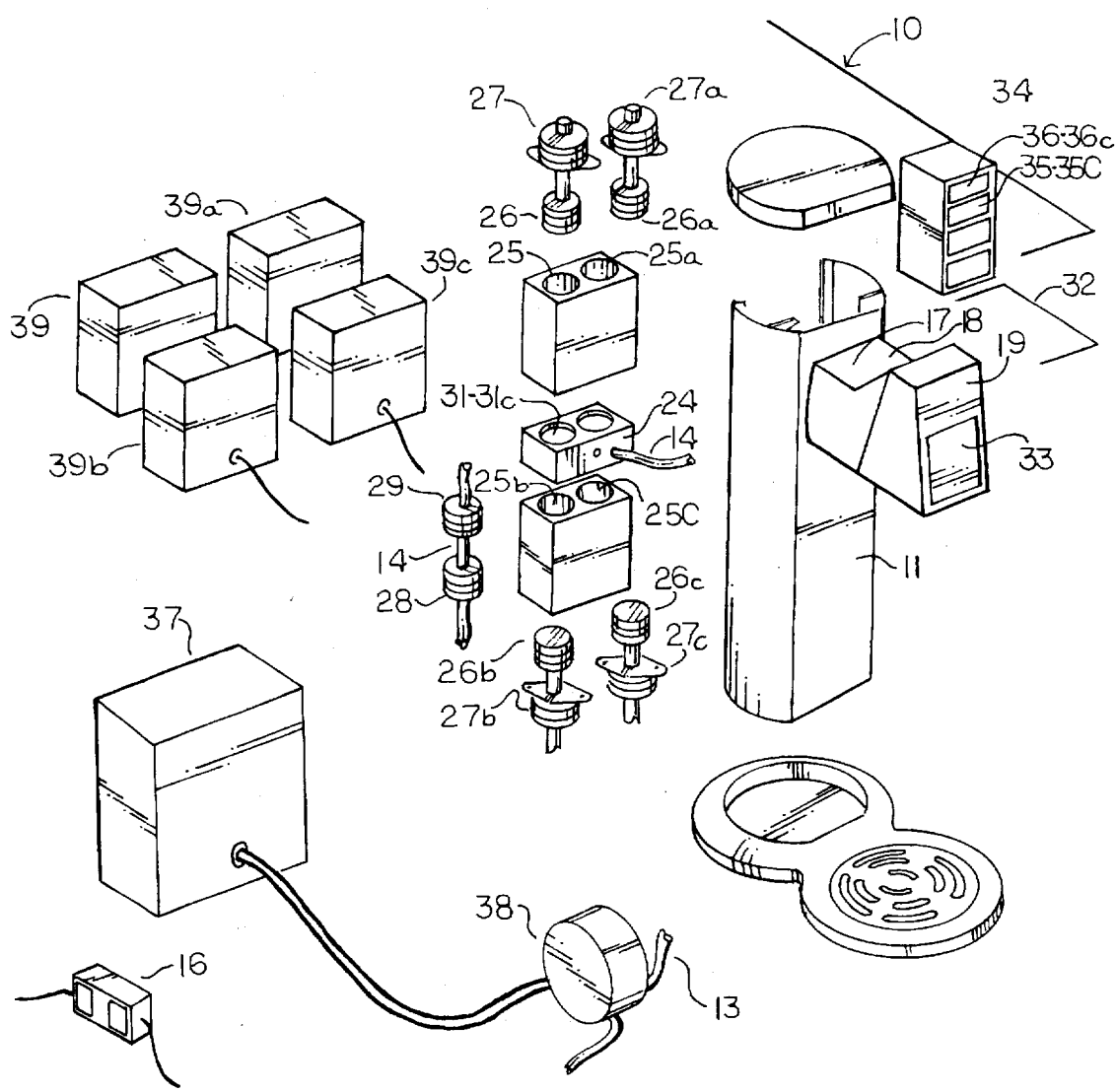
FIG. 1 is a perspective, exploded view of the novel means for providing multiple flavored beverages from a dispensing valve from a beverage dispensing unit.

As shown in the figures, the novel means 10 for providing multiple flavored beverages from a dispensing valve from a beverage dispensing unit comprises a housing 11 for containing and protection of the components contained within. A component support frame 12 provided a means of mounting the internal components. The system has base product supply lines 13 and liquid supply line 14, which has line filter 28 and check valve 29 to allow liquid flow in one direction only. The systems power supply 16 provided the source of power to the system through a number of comof the system. There would be far less space required when dispensing multiple flavored beverages than with other systems and finally, the flavors of the beverages would be enhanced due to the fact that the flavor is introduced at the time the beverage is being dispensed. Additionally, it is a simple matter to add a sanitizing mode of operation for the system. A logic board could send a signal after a pre-set number of servings to the flavor dispensing indicators to notify the operator. He or she would disconnect the base product container and the flavor reservoirs from their respective supply line and attach containers of cleaning solution to these lines. A timed sanitize mode would be initiated by the logic board. Upon completion of the cycle, the cleaning solution containers would be removed and the base product container and flavor reservoirs would be reconnected.

While we have described our invention in connection with specific embodiments thereof, it is clearly to be understood that this is done only by way of example and not as a limitation to the scope of our invention as set forth in the objects thereof and in the appended claims.

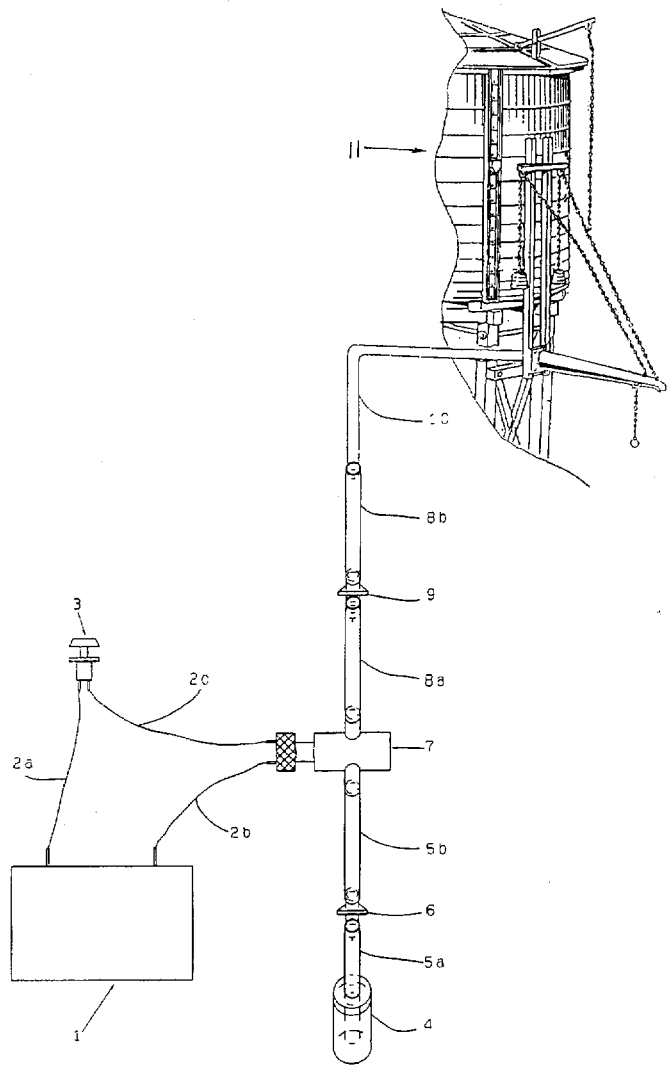

We claim:

1. A method for providing multiple flavored beverages from a dispensing valve from a beverage dispensing unit, for use by drinking fountain locations in order to provide a flavored beverage from a multiple number of flavors in a limited amount of space, comprising the steps of:

providing a housing for supporting and protecting the components of the novel beverage dispensing unit, said housing having a base unit for the support of the components of the beverage dispensing unit and a support frame for the mounting of internal components of the beverage dispensing unit;

providing means for supplying liquid, base product and power for the beverage dispensing unit by providing a base product supply line, liquid supply line and power supply line;

providing means for controlling the liquid, base product and power for beverage dispensing unit by means of control valves;

providing a flavor system for the beverage dispensing unit by means of a flavor block with the base product and liquid in order to inject flavors where desired in order to produce a flavored beverage and using flavor containers for storing the flavors, ejecting flavor from said flavor containers with flavor container pistons and having driving means causing the flavor container pistons to move and displace flavor from the flavor container to the flavor block and using a check valve to prevent backflow;

providing at least one dispensing head for delivering the liquid, base product and flavor to a serving container; and providing means for controlling and directing the beverage dispensing unit.

2. A method for providing multiple flavored beverages from a dispensing valve from a beverage dispensing unit, according to claim 1, wherein:

said providing at least one dispensing head step comprises using a beverage dispensing actuator to open the liquid and base product solenoid dispensing valves.

3. A method for providing multiple flavored beverages from a dispensing valve from a beverage dispensing unit, according to claim 1, wherein:

said providing means for controlling and directing the beverage dispensing unit step comprises the installation of a logic board in order to provide a means for processing input and output signals;

said providing means for controlling and directing the beverage dispensing unit step further comprises the installation of flavor devices which signal the logic board and allow for the selection of the desired flavor to be dispensed; and said providing means for controlling and directing the beverage dispensing unit step further comprises flavor dispensing indicators for identifying the flavor being dispensed.

4. Means for providing multiple flavored beverages from a dispensing valve from a beverage dispensing unit, for use in drinking fountain locations in order to provide a flavored beverage from a multiple number of flavors in a limited space, comprising:

housing means for protecting the beverage dispensing unit;

said housing means comprising a rigid structure;

said housing means having at least one support frame for mounting the internal components within said housing means;

power supply means for providing a source of power to said beverage dispensing unit;

said power supply means comprising means for allowing power to flow to said beverage dispensing unit;

a plurality of supply lines for allowing the flow of base product and liquid from storage sources to said beverage dispensing unit;

means for directing the flow of base product and liquid from said storage sources to said beverage dispensing unit;

said flow directing means comprising flow control valves on said base product supply line and said liquid supply line;

said flow directing means further comprising base product and liquid dispensing values positioned in series with said base product supply line and said liquid supply line;

a flavor system;

said flavor system comprising means for introducing different flavors into said base product and or said liquid;

said introduction means of said flavor system comprising a flavor block positioned where desired;

said flavor system comprising container means for storing said multiple flavors;

said flavor system having a check valve for preventing base product or liquid from entering said flavor container means;

said flavor system further having drive means for directing said flavors from said flavor container to said flavor block;

said drive means comprising a flavor container piston for driving said flavor from said flavor container to said flavor block;

said flavor container piston having a motor for driving said flavor container piston;

a beverage delivery system for directing the flow of base product, flavor and liquid into a serving container;

operational control means for providing the oversight and control of said beverage dispensing unit; and said operational control means comprising a logic board for processing input and output signals from said beverage dispensing unit.

5. Means for providing multiple flavored beverages from a dispensing valve from a beverage dispensing unit, according to claim 4, wherein:

said beverage delivery system comprises at least one dispensing head for directing the flow of base product, liquid and flavor to a serving container; and said beverage delivery system further comprises a beverage dispensing actuator for directing the operation of said base product and liquid solenoid dispensing valve.

6. Means for providing multiple flavored beverages from a dispensing valve from a beverage dispensing unit, according to claim 4, wherein:

said operational control system comprises a flavor device switch for signaling said logic board the flavor to be dispensed.

* * * * *

United States Patent [19]

Poissant

[11] Patent Number: 5,725,126
[45] Date of Patent: Mar. 10, 1998

[54] PUMP SYSTEM FOR TRANSPORTING LIQUID SMOKE FOR MODEL RAILROADS

[75] Inventor: Matthew N. Poissant, Portsmouth, Va.

[73] Assignee: Samsung Electronics Co., Ltd., Suwon, Rep. of Korea

[21] Appl. No.: 406,377

[22] Filed: Mar. 17, 1995

[51] Int. Cl.$^6$ .................................................. G01F 11/00
[52] U.S. Cl. ............................ 222/78; 222/333; 446/24
[58] Field of Search ...................... 222/78, 333; 446/24

[56] References Cited

U.S. PATENT DOCUMENTS

| | | | |
|---|---|---|---|
| 3,190,502 | 6/1965 | Knibb | 222/333 X |
| 3,272,510 | 9/1966 | Ohlund et al. | 446/24 X |
| 4,303,397 | 12/1981 | Swiatosz | 446/24 X |
| 4,456,149 | 6/1984 | Sciortino | 222/333 X |
| 4,741,717 | 5/1988 | Wolf | 446/24 |
| 5,370,278 | 12/1994 | Raynie | 222/333 X |

FOREIGN PATENT DOCUMENTS 458202  12/1936  United Kingdom ................. 222/333

*Primary Examiner*—Joseph Kaufman
*Attorney, Agent, or Firm*—Cushman Darby & Cushman, IP Group of Pillsbury Madison & Sutro LLP

[57] ABSTRACT

This pump system is for model railroading enthusiasts that can be easily installed into any type of structure for model railroading. The pump system is a system for transporting liquid smoke for all scales in model railroading. This pump system will enhance the realism of the model railroad layout. The purpose of this system is to eliminate the manual application of applying liquid smoke to an engine's smoke stack or structure that requires liquid smoke.

1 Claim, 4 Drawing Sheets